(12) United States Patent
Mori et al.

(10) Patent No.: US 8,132,965 B2
(45) Date of Patent: Mar. 13, 2012

(54) HYDRODYNAMIC TYPE OIL-IMPREGNATED SINTERED BEARING

(75) Inventors: Natsuhiko Mori, Kuwana (JP); Katsumi Nagano, Tokyo-to (JP); Yoshihiko Oeda, Tokyo-to (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/944,471

(22) Filed: Nov. 11, 2010

(65) Prior Publication Data

US 2011/0057527 A1    Mar. 10, 2011

Related U.S. Application Data

(62) Division of application No. 09/320,649, filed on May 27, 1999, now Pat. No. 7,988,361.

(30) Foreign Application Priority Data

May 28, 1998   (JP) .................................... 10-147837
May 28, 1998   (JP) .................................... 10-147838

(51) Int. Cl.
  *F16C 32/06*    (2006.01)
(52) U.S. Cl. ........................ 384/118; 384/114; 384/902
(58) Field of Classification Search .................. 384/107, 384/111, 114, 118, 120, DIG. 902
  See application file for complete search history.

(56) References Cited

U.S. PATENT DOCUMENTS

| | | | |
|---|---|---|---|
| 5,022,492 A | 6/1991 | Ohno et al. | |
| 5,504,637 A | 4/1996 | Asada et al. | |
| 5,707,944 A | 1/1998 | Yokouchi et al. | |
| 5,746,516 A | 5/1998 | Miyasaka et al. | |
| 5,941,646 A | 8/1999 | Mori et al. | |
| 6,000,850 A | 12/1999 | Takahashi et al. | |
| 6,023,114 A * | 2/2000 | Mori et al. | ....... 310/90 |
| 6,299,356 B1 | 10/2001 | Okamura et al. | |

FOREIGN PATENT DOCUMENTS

| | | |
|---|---|---|
| DE | 292 673 A5 | 8/1991 |
| GB | 2 064 676 A | 6/1981 |
| GB | 2 320 743 A | 7/1998 |
| JP | 05-255685 A | 10/1993 |
| JP | 06-264926 A | 9/1994 |
| JP | 08-266007 A | 10/1996 |
| JP | 09-087652 A | 3/1997 |
| JP | 09-217735 A | 8/1997 |
| JP | 09-316210 A | 12/1997 |
| JP | 10-68418 A | 3/1998 |
| WO | WO 97/16828 A1 | 5/1997 |

* cited by examiner

*Primary Examiner* — William C Joyce
(74) *Attorney, Agent, or Firm* — Arent Fox, LLP

(57) ABSTRACT

A hydrodynamic type oil-impregnated sintered bearing includes a porous bearing body of sintered metal having a bearing surface in which hydrodynamic pressure generating grooves slating against an axial direction are provided. Lubricating oil or the base oil of lubricating grease to be impregnated into the bearing body is selected from among (a) mixtures of poly-α-olefin or hydrogenated compound thereof and ester and (b) ester. The ester is preferably polyol ester. In the cases of the lubricating grease, the thickener of the lubricating grease is preferably composed of urea compound. A plurality of bearing surfaces may be formed on the inner periphery of the bearing body so as to be separated from one another. The hydrodynamic type oil-impregnated sintered bearing may be suitably applied to a spindle motor for information equipment.

6 Claims, 6 Drawing Sheets

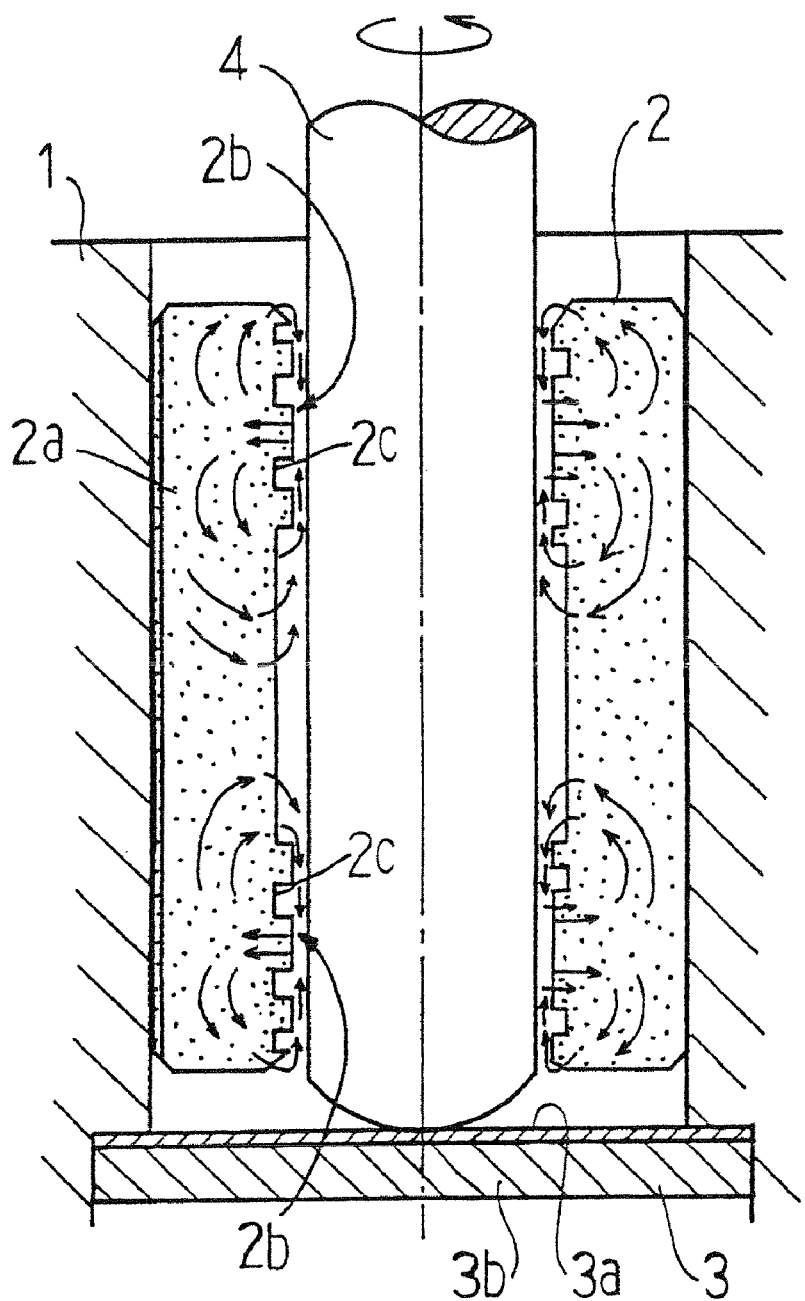

F I G. 4
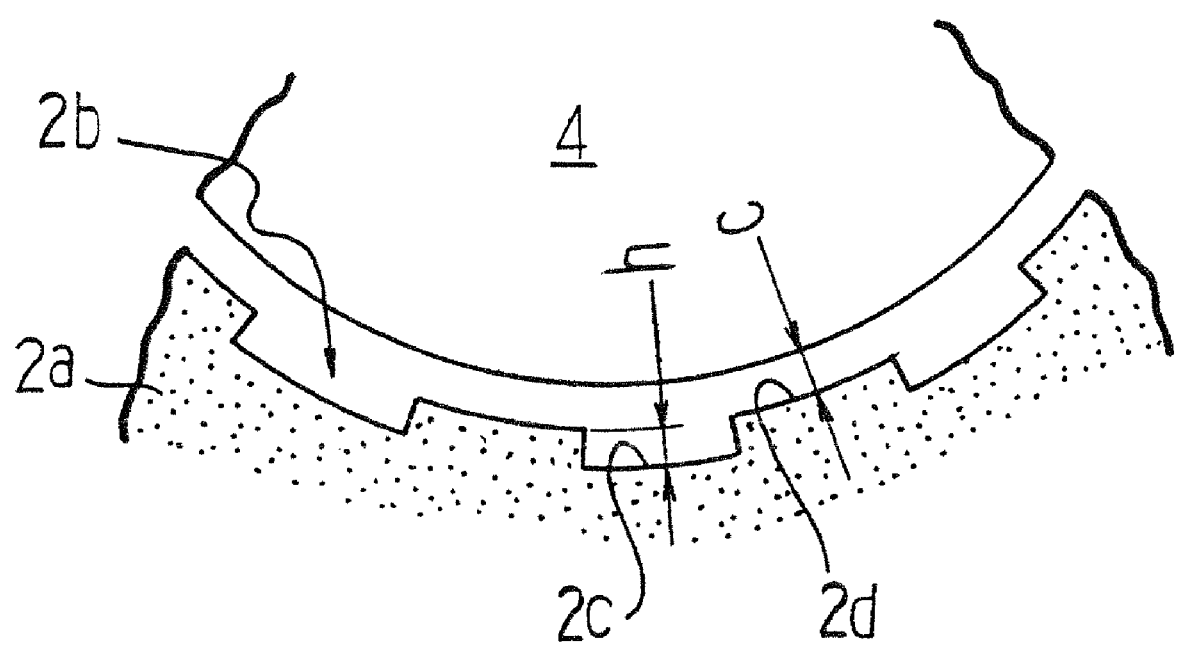

HYDRODYNAMIC TYPE OIL-IMPREGNATED SINTERED BEARING

CROSS-REFERENCE TO RELATED APPLICATIONS

This application is a Divisional of U.S. patent application Ser. No. 09/320,649 filed on May 27, 1999, which claims the benefit of priority Japanese Patent Application No. 10-147837, filed on May 28, 1998 and Japanese Patent Application No. 10-147838, filed on May 28, 1998, the entire contents of which are incorporated herein by reference.

BACKGROUND OF THE INVENTION

The invention relates to a hydrodynamic type oil-impregnated sintered bearing in which its porous bearing body of sintered metal is impregnated with lubricating oil or lubricating grease as a lubricant so as to have a self-lubricating function, and the hydrodynamic pressure effect of hydrodynamic pressure generating grooves in the bearing surfaces thereof forms a lubricating film in the bearing clearance, so that the lubricating film non-contact supports the sliding surfaces of a rotating shaft. The hydrodynamic type oil-impregnated sintered bearing according to the present invention is suitably applied to spindle motors for information equipment. Of these, especially suitable applications are those required for high rotational accuracies at higher speeds, such as a polygon scanner motor in a laser beam printer (LBP) and a spindle motor for a hard disk drive (HDD), and those driven at higher speeds under a condition in which the loading of disks produces an unbalanced load, such as a spindle motor for optical disk devices including DVD-ROMs and DVD-RAMS, and for magneto-optical disk devices including MOs.

Information equipment is generally divided into two types: main storages for data processing and storing, and secondary storages for storing only. Storing components thereof are classified into those using disks or tapes, and those consisting of electronic parts only. At present, disks and tapes are widely used in view of cost. The secondary storages using disks and tapes include magnetic disk drives (HDD, FDD), optical disk drives (CD, DVD), magneto-optical disk drives (MO, ODD), and digital audio tape recorders (DAT). Information equipment further includes laser beam printers (LBP), digital FAXs, and digital PPCs.

Such small-size spindle motors for information equipment as described above are required for further-improved rotation performance, lowered noises, and lowered cost. For those means, studies have been made on the replacement of rolling bearings for the spindles with oil-impregnated sintered bearings. However, since an ordinary oil-impregnated sintered bearing is a sort of cylindrical bearing, unstable vibration easily occur in its shaft at smaller eccentricities. This leads to a drawback of the easy occurrence of a so-called whirl, in which the shaft deviates around at a speed ½ the rotating speed. (The occurrence of unstable vibrations such as a whirl deteriorates the rotational accuracy.) Approaches thereto have been previously made in which hydrodynamic pressure generating grooves of herringbone type, spiral type, and the like are provided in the bearing surfaces so that the hydrodynamic pressure effect of the hydrodynamic pressure generating grooves created with the rotation of the shaft enhances the bearing functions such as radial rigidity for suppressing the shaft run-out caused by the unstable vibrations (hydrodynamic type oil-impregnated sintered bearings).

A hydrodynamic type oil-impregnated sintered bearing is characterized in that the oil retained in pores inside the bearing body forms a lubricating film in the bearing clearance by the effect (the oil-drawing effect) of the hydrodynamic pressure generating grooves while circulating between the bearing body and the bearing clearance, so that the lubricating film continuously non-contact supports a rotating shaft. In order to develop such a stable bearing function, proper circulation of the oil and secured formation of the lubricating film needed for supporting the shaft are required. One of the essential factors thereto is the selection of a lubricant to be impregnated into the bearing body.

An ordinary cylindrical bearing (oil-impregnated sintered bearing having no hydrodynamic pressure generating groove in the bearing surfaces thereof) uses, for example, lubricating oil of poly-α-olefin compounded with various types of additives, as disclosed in Japanese Patent Laid-Open Publication No. Hei 7-53984. The lubricating oil has excellent properties for lubricating oils dedicated to oil-impregnated sintered bearings. The properties include small generation of sludge in use, a wide available temperature range, excellent lubricity, high conformability at lower torques, and good durability. However, it has been found that the using of this oil as the impregnation oil for a hydrodynamic type oil-impregnated sintered bearing sometimes produces a slight whirl. No clear explanation thereto has been presently given; however, it seems to have a connection with the poly-α-olefin's tendency of producing bubbles in oil when used as impregnation oil, and the peculiar oil-drawing effect of hydrodynamic type oil-impregnated sintered bearings.

The occurrence of a whirl becomes critical especially in the cases of polygon scanner motors in laser beam printers (LBP), in which the motors are driven at high speeds of several tens of thousands of rotations, and in the applications required for non repeatable run out (NRRO), such as a hard disk drive motor (HDD), a high capacity floppy disk drive motor (Zip, HiFD), and an optical disk motor (DVD-RAM); and it fatally hampers the maintenance of accuracies such as required jitter (jitter means unstable fluctuations in pulse amplitudes and on-a-time-axis parameters of a pulsed sequence of reflected light coming from a polygon mirror, or the value of the fluctuation), NRRO, and surface run-out. Since required for lower torques as well as higher rotatabilities, spindle motors of this type use low-viscositied impregnation oil. However, poly-α-olefin is high in evaporation, and even higher at lower viscosities; therefore, need for a long endurance life is not always satisfied at higher speeds and in high-temperatured atmospheres.

Besides, although the hydrodynamic type oil-impregnated sintered bearings of this type have an high effect of suppressing run-out, they also have a phenomenon of lowering the hydrodynamic pressure effect (pressure drop) due to the run-off of the oil from the bearing clearance to the inside of the bearing body through surface holes in the bearing surfaces, which gives rise to a problem in that the expected hydrodynamic pressure effect is hard to obtain. As means for solving the pressure-drop problem, a constitution has been conventionally known in which a surface filling-up process is applied to the hydrodynamic pressure generating grooves in the bearing surfaces to seal the forming areas of the hydrodynamic pressure generating grooves (Japanese Patent Laid-Open Publication No. Sho 63-19627).

However, the constitution with the sealed forming areas of the hydrodynamic pressure generating grooves leads to problems as follows:
1. Since the forming areas of the hydrodynamic pressure generating grooves are completely sealed, the oil circulation, which is the greatest feature of oil-impregnated sintered bearings, is hampered in the areas. Accordingly, once exuded into the bearing clearance, the oil is driven to axial central portions on the bearing surfaces by the action of the hydrodynamic pressure generating grooves, and left in the bearing clearance. In the bearing clearance, large shearing action is at work; hence, the left oil is easily denatured by shearing forces and frictional heats there, and accelerated in degree of oxidation degradation due to an increase in temperature. This consequently shortens the life of the bearing.

2. The proposed means for the surface filling-up include coating and the like. However, coating films in the coating need to be thinner than the depth of the grooves, and it is extremely difficult to apply such thin coating films of several micrometers onto only the forming areas of the hydrodynamic pressure generating grooves.

Besides, Japanese Patent Laid-Open Publications No. Sho 63-195416 and No. Hei 7-42740 describe techniques of impregnating a sintered article with lubricating grease (oil-impregnated sintered bearings); however, these techniques are intended for cylindrical bearings having no hydrodynamic pressure generating groove in the bearing surfaces, and offer so small radial rigidities in a domain of small eccentricities that the unstable vibrations such as a whirl cannot be suppressed effectively.

SUMMARY OF THE INVENTION

In view of the foregoing, an object of the present invention is to appropriately adjust the lubricant to be impregnated into hydrodynamic type oil-impregnated sintered bearings to allow the hydrodynamic type oil-impregnated sintered bearings to exert their intrinsic stable bearing functions, thereby preventing the occurrence of unstable vibrations such as a whirl, which is the biggest problem especially in spindle motors of this type, and increasing the life of the bearings.

Another object of the present invention is to secure the proper oil circulation between the inside of the bearing body and the bearing clearance and solve the pressure-drop problem in the bearing clearance, in bearings of this type, so as to further improve the bearing functions, especially the rigidity of the bearing (the load capacity of the bearing) and the life of the bearing.

To achieve the foregoing objects, the present invention provides a constitution comprising: a porous bearing body of sintered metal having a bearing surface opposed to a sliding surface of a rotating shaft to be supported via a bearing clearance, and hydrodynamic pressure generating grooves slating against an axial direction provided in the bearing surface; and lubricating oil or lubricating grease impregnated in pores inside the bearing body. In the constitution, the lubricating oil or the base oil of the lubricating grease is one lubricating oil selected from among (a) mixtures of poly-α-olefin or hydrogenated compound thereof and ester and (b) ester.

FIG. 3 shows the flow of oil in an axial cross-section in supporting a rotating shaft 4 with a hydrodynamic type oil-impregnated sintered bearing 2 according to the present invention comprising bearing surfaces 2b having hydrodynamic pressure generating grooves 2 formed. With the rotation of the rotating shaft 4, the oil retained in pores (in this specification document, the word "pore" means a hole a porous article has as its texture) inside the bearing body 2a exudes from both axial sides of the bearing surfaces 2b (and the vicinities of chamfered portions) into the bearing clearance, and then is drawn toward axial central portions in the bearing clearance by hydrodynamic pressure generating grooves 2c. The oil lying in the bearing clearance is increased in pressure by the oil-drawing effect (hydrodynamic pressure effect) of the grooves 2c to form a lubricating film. By means of the lubricating film formed in the bearing clearance, the rotating shaft 4 is non-contact supported against the bearing surfaces 2b without producing unstable vibrations such as a whirl. By a pressure created with the rotation of the rotating shaft 4, the oil having exuded out in the bearing clearance is driven back into the bearing body 2a through surface holes (in this specification document, the word "surface hole" means an externally-opening pore in the surface of the porous article's texture) in the bearing surfaces 2b, circulates through the inside of the bearing body 2a, and newly exudes out from the bearing surface 2b (and the vicinities of the chamfered portions) into the bearing clearance. Note that the word "oil" here means the lubricating oil impregnated in the bearing body 2a, or the base oil (lubricating oil) of the lubricating grease impregnated in the bearing body 2a. In the latter case, the base oil circulates between the bearing body 2a and the bearing clearance with a small amount of thickener component.

As the lubricating oil or the base oil of the lubricating grease to be impregnated in a hydrodynamic type oil-impregnated sintered bearing, synthetic lubricating oil of poly-α-olefin or hydrogenated compound thereof compounded with ester {the constitution in the above-mentioned (a)} can be used to maintain the stable bearing functions of the hydrodynamic type oil-impregnated sintered bearing as described above over a long period. This seems because the mixing of ester suppresses the production of bubbles in poly-α-olefin, or immediately eliminates the produced bubbles.

The compounding ratio of ester to poly-α-olefin or its hydrogenated compound is preferably equal to or greater than 5% by weight. At compounding ratios of ester below 5%, unstable vibrations such as a whirl cannot be avoided completely. On the contrary, the compounding ratio of ester has no upper t, and may be increased up to 100% by weight {the constitution in the above-mentioned (b)}.

Poly-α-olefin (hereinafter, abbreviated as "PAO") to be used in the present invention ranges from 200 to 1600 in average molecular weight, preferably from 400 to 800, and is suitably obtained from decene-1, isobutene, or the like polymerized with a Lewis acid complex, an aluminum oxide catalyst, or the like. PAO hydrogenated compound (hereinafter, abbreviated as "PAOH") is obtained by hydrogenating PAO using a hydrogenating catalyst. PAO or PAOH can be used as a component of lubricating oil or the base oil of lubricating grease to improve heat resistance and to extremely suppress the production of sludge in the oil.

Ester to be used in the present invention may be any of monoester (ester of monovalent alcohol and monovalent fatty acid), diester (ester of monovalent alcohol and divalent fatty acid), polyol ester (such as ester of neopentyl-structured alcohol and monovalent fatty acid), and complex ester (oligomeric ester obtained by adding polyol ester as a material with polyvalent fatty acid and crosslinking the polyol). Of these, polyol ester is preferable since it is superior in compatibility, and has an excellent vaporization property at lower viscosities. Ester can be compounded with PAO (or PAOH) or can be used independently to eliminate polyolefins' drawbacks in solubility, and to improve their vaporization property and lubricity. In addition, ester functions as a sort of anti-abrasion agent.

The lubricating oil or lubricating grease to be used in the present invention is preferably compounded with phosphoric ester as shown in the undermentioned general formula (2). The phosphoric esters include, for example, triester phosphates such as trioctyl phosphate and tricresyl phosphate, acidic phosphoric esters such as monooctyl phosphate ester and dioctyl phosphate ester, and amine salts of alkyl phosphate ester (partial amine salts). Of these, triester phosphate is preferable. The phosphoric esters can be used to increase film formability of oil. In this connection, in the undermentioned general formula (2), R1 to R3 are selected from among: hydrogen atom; alkyl group, alkylene group, or alkoxy substituted alkylene group having from 1 to 12 carbon atoms; and aryl group or alkyl substituted aryl group having from 6 to 12 carbon atoms. These may be identical to or different from one another. At least one of these needs to be a group other than hydrogen atom.

[General formula (2)]

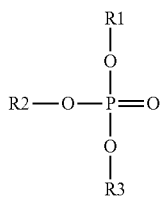

The compounding ratio of phosphoric ester to the lubricating oil or the base oil ranges from 0.1% to 10% by weight, and preferably from 0.5% to 3% by weight. Compounding ratios of phosphoric ester below 0.1% by weight cannot improve abrasion resistance while applications over 10% by weight do not improve abrasion resistibility much further.

The lubricating oil or the lubricating grease to be used in the present invention may be compounded with ethylene/a-olefin copolymer, hydrogenated compound thereof, or polymethacrylate or polybutene (polyisobutylene) additives as a viscosity index improver or a grease structure stabilizer. Ethylene/α-olefin copolymer is obtained by, for example, polymerizing ethylene and 1-decene, isobutene, and the like using a catalyst such as a Lewis acid. Hydrogenated compound thereof is obtained by hydrogenating ethylene/α-olefin copolymer using a hydrogenating catalyst. These articles have a number average molecular weight on the order of 200 to 4000. Those of 1450 in number average molecular weight are preferable. The polymethacrylate additives generally range from 20000 to 1500000 in number average molecular weight, and preferably from 20000 to 50000 in view of shear stability. The polybutene additives preferably range from about 5000 to 300000 in number average molecular weight. These additives are better compounded into the lubricating oil or the lubricating grease at compounding ratios ranging from 1% to 30% by weight, and preferably from 1% to 5% by weight. These additives functioning as a viscosity index improver or a grease structure stabilizer can be compounded to improve the lubricating oil or the lubricating grease in temperature characteristics and to prevent a drop in viscosity of the lubricating film in the bearing clearance, so that the shaft run-out and the like are effectively avoided.

A thickener of the lubricating grease to be used in the present invention is to disperse in the base oil so as to form micellar structures to become a semisolid state. Soaps such as sodium soap, lithium soap, calcium soap, calcium complex soap, aluminum complex soap, and lithium complex soap, waxes such as penton, silica aerogel, sodium terephthalamate, urea, polytetrafluoroethylene, and polyethylene powder, and non-soaps such as boron nitride may be used as the thickener. Of these, urea is especially preferable due to its excellent separation resistance at higher temperatures under higher centrifugal forces. Thickeners of diurea and the like are especially appropriate.

Besides, the lubricating oil or the lubricating grease to be used in the present invention may be compounded with metal deactivators. Benzotriazole and its derivatives are typical metal deactivators. Imidazoline and pyridine derivatives may also be used. Of these, compounds having at least a N—C—N bond are often effective, and have a function of forming deactivated films on metal surfaces and an antioxidant function. Some other compounds have a N—C—S bond. In view of solubility to the lubricating oil, volatility and the like, benzotriazole derivatives are effective. The metal deactivators are better compounded into the lubricating oil or the base oil of the lubricating grease at compounding ratios ranging from 0.05% to 5% by weight.

Moreover, the lubricating oil or the lubricating grease to be used in the present invention may be compounded with antioxidants. As for the antioxidants, more than one antioxidant selected from among phenol type and amine type antioxidants, which function as a free radical chain reaction stopper, and sulfuric antioxidants, which function as a peroxide decomposition agent, may be used independently, or mixtures thereof may be used. Here, mixtures of amine type and phenol type antioxidants are preferably used. The phenol type antioxidants include, for example, 2,6-di-t-butylphenol, 4,4'-methylenebis(2,6-di-t-butylphenol), 2,6-di-t-butyl-4-ethylphenol, and 2,6-di-t-4-n-butylphenol. In view of vaporization property and compatibility to lubricating oil, 4,4'-methylenbis(2,6-di-t-butylphenol) is suitable. The amine type antioxidants include dioctyldiphenylamine and phenyl-α-naphthylamine. In view of vaporization property and compatibility to lubricating oil, dioctyldiphenylamine is suitable. As for the compounding ratios, in consideration of solubility to the lubricating oil, the amine type antioxidants ranging from 0.1% to 10% by weight and the phenol type antioxidants ranging from 0.1% to 10% by weight are preferably compounded into the lubricating oil or the base oil of the lubricating oil. In independent use, the amine type antioxidants suitably range from 0.1% to 10% by weight. The phenol type antioxidants have no effect unless used with amine type antioxidants.

Furthermore, according to need, the lubricating oil or the lubricating grease to be used in the present invention may be compounded with rust preventives, pour-point depressants, ashless dispersing agents, metallic detergents, surface-active agents, friction regulators, and the like inasmuch as the objects and effects of the present invention are unchanged.

The bearing surfaces comprising the slanting hydrodynamic pressure generating grooves can be formed by molding the forming areas of the hydrodynamic pressure generating grooves and the other areas simultaneously using a forming mold having the shape corresponding to the bearing surfaces. This process can be performed, for example, in such a manner that: a forming mold in the shape corresponding to the shapes of the bearing surfaces is formed on the outer periphery of a core rod; sintered metal material is supplied to the forming mold on the core rod; and a compressing force is applied thereto so that the inner periphery of the sintered metal material is pressed against the forming mold on the core rod and thereby plastic deformed. After the molding of the bearing surfaces, the spring back of the porous material resulting from the removal of the compressing force can be utilized to release the porous material from the forming mold on the core rod.

As for the material of the bearing body, the main material of more than one type of metal powders selected from among copper, iron, and aluminum is mixed with, if necessary, powdered tin, zinc, lead, graphite, or powdered alloys thereof, and then sintered into sintered metal. The using of such sintered metal allows the bearing body to be produced with high accuracy and low cost via the compression molding as described above.

One bearing may have any number of bearing surfaces, either singular or plural, and may be configured so that: a plurality of bearing surfaces are formed on the inner periphery of the bearing body so as to be axially separated each other; and the inner diameters at portions between bearing surfaces are greater than the inner diameters at the bearing surfaces excepting the hydrodynamic pressure generating grooves. The forming of a plurality of bearing surfaces on a bearing can solve a problem, which arises in the cases of using a plurality of bearings, in coaxiality between respective bearing surfaces. That is, in order to secure rotational accuracy of a shaft, ordinary bearings are used in plural, e.g., in two, and those bearing are often force fitted into a housing in use. In conventional methods, correcting pins are, therefore, inserted into the housing before the force fitting of the two bearings to secure the coaxiality between the two bearings. However, in the constitution of the present invention in which the slant hydrodynamic pressure generating grooves are provided in the bearing surfaces, when correcting pins are used for forcible correction, the bites of the correcting pins scrape the hydrodynamic pressure generating grooves, eliminating the stable hydrodynamic pressure effects. In this case, the above-described formation of a plurality of bearing surfaces on one bearing solves the problem in the coaxiality between the respective bearing surfaces, thereby eliminating the conventional need for the securement of coaxiality by means of correcting pins. This accordingly avoids a disadvantage in the scraping of hydrodynamic pressure generating grooves in bearing surfaces. Besides, the bearing is reduced in number of component parts and in number of assembling processes as compared with the cases of providing a plurality of bearings. In addition, the inner diameters at the portions between the bearing surfaces can be arranged to be greater than the inner diameters at the bearing surfaces excepting the hydrodynamic pressure generating grooves to suppress an increase in torque.

As described above, a hydrodynamic type bearing of this type is characterized in that the oil retained in pores inside the bearing body is circulated between the bearing body and the bearing clearance while the effect of the hydrodynamic pressure generating grooves forms a lubricating film in the bearing clearance so that the lubricating film continuously non-contact supports a rotating shaft. In order to develop such stable bearing functions, proper circulation of the oil and secured formation of the lubricating film needed for supporting the shaft are required. While as the oil circulation prevents the deterioration of the oil and thereby increases the life of the bearing, it also acts a complemental, or antagonistic roll on the formation of lubricating films. Therefore, how to circulate the oil properly is an extremely important problem to a hydrodynamic type bearing of this type. In other words, the continuous forming of a lubricating film having an adequate pressure and film thickness in the bearing clearance always requires the proper functioning of an oil circulation cycle in which an appropriate amount of fresh oil continuously exudes out from the bearing body into the bearing clearance to form the lubricating film, and returns from the bearing clearance into the bearing body. When the oil is too small in circulating amount, a lack occurs in amount of the oil exuding into the bearing clearance, which results in the insufficient formation of lubricating film. Besides, the oil is left inside the bearing clearance, in which increased temperatures cause the oxidation deterioration of the oil. On the other hand, when the oil is too large in circulating amount, the oil excessively returns from the bearing clearance to the bearing body, leading to the above-described problem in a pressure drop.

Means for controlling the circulating amount of oil include the adjusting of the rate of surface hole area (areal ratio of surface holes by unit area) and the adjusting of the kinematic viscosity of oil. However, adjusting the rate of surface hole area cannot control the dimensions of respective surface holes and pores; therefore, a local pressure drop inevitably occurs in the cases where a large surface hole opens in a bearing surface or a large pore exists inside a surface layer portion at a prescribed depth from a bearing surface. Besides, excessively adjusting the kinematic viscosity of oil produces an increase in torque. Therefore, these means have a certain limit, and adequate bearing functions cannot be often obtained, considering the recent tendency of further improvements in rotation speed and performance of spindle motors.

In such cases, hydrodynamic pressure generating grooves may be provided in the bearing surfaces of the porous bearing body so as to slant against the axial direction, and lubricating grease ranging from 0.1% to 5.0% by weight in compounding ratio of thickener may be provided as the lubricant to be impregnated into the bearing body.

When lubricating grease is used as a lubricant to be impregnated into the bearing body, the thickener contained in the lubricating grease is not filled into very small pores and surface holes, but into relatively large pores and surface holes selectively. As a result, respective surface holes in the bearing surfaces are averaged in area, and respective pores in the surface layer portions at a prescribed depth from the bearing surfaces are averaged in cross sectional area, leading to the harder occurrence of local pressure drops. This also adjusts the oil to its proper amounts in exuding from the bearing body to the bearing clearance and in returning from the bearing clearance to the bearing body. By this means, the hydrodynamic pressure generating grooves are enhanced in their effects of forming a lubricating film to improve the rigidity of the bearing (the load capacity of the bearing) as well as the proper circulation of the oil is secured to increase the life of the bearing. Note that the word "oil" here means the base oil of the lubricating grease impregnated in the bearing body, which usually contains a small amount of thickener component in being circulating between the bearing body and the bearing clearance.

At compounding ratios of the thickener below 0.1% by weight, the effects as described above do not noticeably appear. On the other hand, at compounding ratios above 5.0% by weight, the consistency of the lubricating grease becomes too high, which complicates the operations in its impregnating process. That is, the bearing does not sink into the grease instantly, and it becomes harder to remove the grease off the surfaces of the bearing after the impregnation.

The thickener in lubricating grease to be used in the present invention may be either soap or non-soap. Of these, urea compounds are preferably used as the thickener. Since urea compounds are strong in interaction force between molecules, they are excellent in shear stability, are easy to adsorb to metal surfaces, and have an effect of improving a lubricating effect. Urea compounds have —NHCONH— in their structural formulae, and include, for example, monourea, diurea, and triurea. Monourea is obtained as a result of the reaction between monoamine and monoisocyanate, diurea as a result of the reaction between monoamine and diisocyanate, and triurea as a result of the reaction among monoamine, trilenediisocyanate, and water, respectively. Among those urea compounds, diurea is preferable in view of material availability and manufacturability.

Urea compounds are shown in a general formula (1):
R1-NHCONH—R2-NHCONH—R3

{wherein R2 represents an aromatic hydrocarbon group having from 6 to 15 carbon atoms, R1 and R3 represent an aromatic hydrocarbon group having from 6 to 12 carbon atoms or an alkyl group having from 8 to 20 carbon atoms, and the rates of aromatic hydrocarbon group in R1 and R3 range from 0% to 100% by mole}, and the rates of aromatic hydrocarbon group in R1 and R3 can be adjusted within a range from 0% to 100% by mole to change the micelle structures freely. Note that, in the urea compounds included in the above-described general formula (1), while the molar ratio cannot be fine adjusted using only one type of diurea, it becomes fine-adjustable by using two or more types of amines to determine R1 and R3, and changing the ratio of the amines. In hydrodynamic type oil-impregnated sintered bearings, while adjusting the rate of surface hole area and the like can suppress pressure drops and heats to some extent, hydrodynamic type oil-impregnated sintered bearings further improved in performance and durability can be obtained by adjusting the micelle structures in the lubricating grease.

In order to suppress shaft run-out and oil leakage, the rate of the aromatic hydrocarbon groups in R1 and R3 in the aforesaid general formula (1) can be increased. The higher the rate of the aromatic hydrocarbon groups is provided, the thicker and the shorter the micelle of the urea becomes. This increases the thickener in content as compared with other thickeners having the same viscosity, thereby effectively suppressing the shaft run-out and improving the durability. On the other hand, in the cases where low electric-current performance is required, the short-fibered and thick micelle has an adverse effect, sometimes causing heat generation. In the cases, the aromatic hydrocarbon groups in the aforesaid R1 and R3 can be reduced in mole percent to lower the thickener content for lower electric current. Accordingly, the urea compounds can be used as the thickener in lubricating grease to be impregnated in hydrodynamic type oil-impregnated sintered bearings to satisfy wide-ranging required properties; therefore, the hydrodynamic type oil-impregnated sintered bearing is extremely advantageous for a bearing for a spindle motor. Here, it is obvious that the aromatic hydrocarbon groups included in the aforesaid R1 and R3 may be adjusted in accordance with applications and use conditions of hydrodynamic type oil-impregnated sintered bearings.

An urea compound is obtained as a result of the reaction between isocyanate and monoamine. The isocyanate to be used include: aromatic diisocyanates such as 2,4-trilenediisocyanate, 2,6-trilenediisocyanate, diphenylmethylene-4,4'-diisocyanate, and naphthylene-1,5-diisocyanate; trilenediisocyanate; triazine derivatives; and mixtures thereof. The monoamine include: aromatic amines such as aniline, benzyl amine, toluidine, and chloroaniline; aliphatic amines such as octylamine, nonylamine, decylamine, undecylamine, dodecylamine, tridecylamine, tetradecylamine, pentadecylamine, hexadecylamine, heptadecylamine, octadecylamine, nonadecylamine, and eicodecylamine; and cyclohexylamine.

The base oil of lubricating grease to be used in the present invention is not limited, but preferably include: among mineral oils, paraffin base mineral oil, hydrogenation-finished paraffin mineral oil, hydrogenation modified paraffin mineral oil, refined naphthenic mineral oil, and high viscosity index paraffin mineral oil; among synthetic lubricants, a poly-α-olefin base, ester base, ether base, polyglycol base, and aromatic hydrocarbon base oils; fluorine base lubricating oil; and mixtures thereof.

In order to improve abrasion resistance and thermostability, the above-mentioned base oils may be compounded with various additives, and are suitably compounded with the phosphoric ester shown in the above-described general formula (2). Here, as described above, the phosphoric ester is better compounded at compounding ratios ranging from 0.1% to 10% by weight, and preferably from 0.5% to 3% by weight. Besides, as a viscosity index improver and a structure stabilizer, methylene-α-olefin copolymer, hydrogenated compound thereof, polymethacrylate base one, or polybutene (polyisobutylene) base one may be added into the aforesaid base oil. In addition, the base oil may be compounded with antioxidants. Moreover, according to need, the aforesaid base oil may be compounded with rust preventives, pour-point depressants, ashless dispersing agents, metallic detergents, oily components, surface-active agents, defoaming agents, friction regulators, and the like inasmuch as the objects and effects of the present invention are secured.

A spindle motor for information equipment according to the present invention, in which the rotating shaft thereof is rotatably supported with a hydrodynamic type oil-impregnated sintered bearing as described above, can satisfy various required characteristics, which include shaft run-off, NRRO, and jitter, growing in severity with an increase in speed and performance of mounted devices, thereby contributing to the function improvement and the life elongation of information equipment.

The nature, principle and utility of the invention will become more apparent from the following detailed description when read in conjunction with the accompanying drawings.

BRIEF EXPLANATION OF THE DRAWINGS

In the accompanying drawings:

FIG. 3 is a schematic diagram showing the flow of oil in an axial cross section in non-contact supporting a rotating shaft with a hydrodynamic type oil-impregnated sintered bearing;

FIG. 4 is a schematic diagram showing the relation between the depth h of a hydrodynamic pressure generating groove in a bearing surface and the bearing clearance c in a hydrodynamic type oil-impregnated sintered bearing;

DETAILED DESCRIPTION OF THE PREFERRED EMBODIMENTS

Hereinafter, the preferred embodiments of the present invention will be described.

Figure 1:
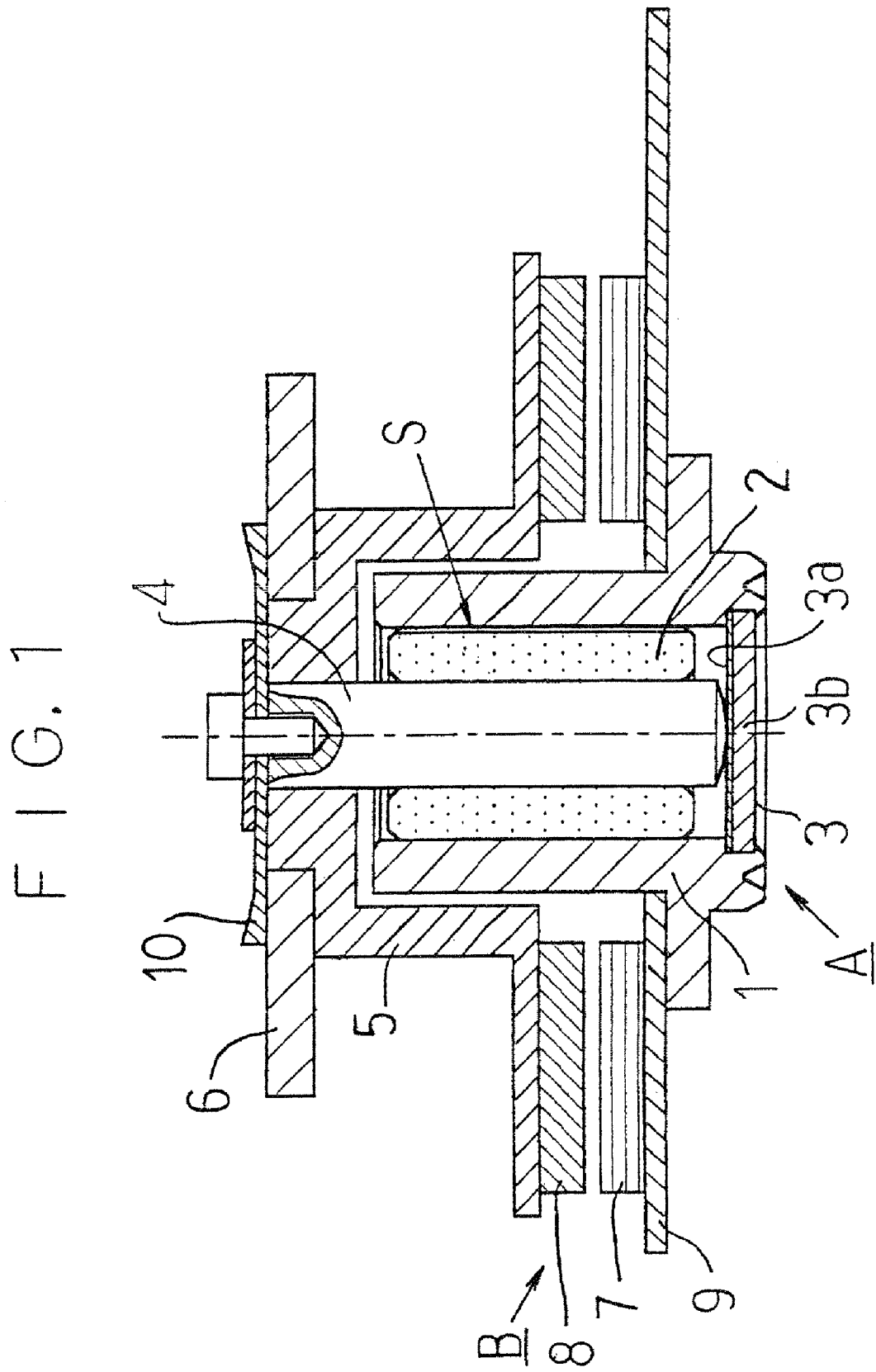
FIG. 1 is a cross-sectional view showing an example of a polygon scanner motor for information equipment.

FIG. 1 shows an example of a spindle motor to be mounted on a laser beam printer (LBP) as a sort of information equipment (such spindle motor is commonly referred to as polygon mirror motor or polygon scanner motor). The spindle motor is composed chiefly of: a bearing unit A for rotatably supporting a vertically-arranged rotating shaft 4; a polygon mirror 6 mounted on the upper end of the rotating shaft 4 via a rotor hub 5; and a motor unit B having, for example, a stator 7 and rotor magnet 8 arranged so as to face each other via an axial gap. The stator 7 is fixed via a base 9 to a housing 1 constituting the bearing unit A. The rotor magnet 8 is fixed to the rotor hub 5. The polygon mirror 6 is elastically pressed against the rotor hub 5 by a pre-load spring 10. Energizing the stator 7 rotates the rotor hub 5, polygon mirror 6, and rotating shaft 4 being integral with the rotor magnet 8. A laser beam from a not-shown source through a prescribed optical system to the polygon mirror 6 is reflected by the high-speed rotating polygon mirror 6 to scan the surface of a photosensitive drum.

The bearing unit A is composed of the tubular housing 1, a hydrodynamic type oil-impregnated sintered bearing 2 force fitted or adhesive bonded and fixed to the inner periphery of the housing 1, and a thrust bearing 3 fixed to the lower opening portion of the housing 1. The hydrodynamic type oil-impregnated sintered bearing 2 supports the outer periphery of the rotating shaft 4 in a radial direction, and the thrust bearing 3 supports the lower end surface of the rotating shaft 4 in a thrust direction. In the present embodiment, the thrust bearing 3 is composed of a resin thrust washer 3a of disk form and a back metal 3b for supporting the same, and is configured so that the upper surface of the resin thrust washer 3 contact supports the convex lower end surface of the rotating shaft 4 in the thrust direction. In this connection, the resin thrust washer 3a may be embedded in the central portion of the back metal 3b so as to contact with the lower end surface of the rotating shaft 4.

Figure 2A:
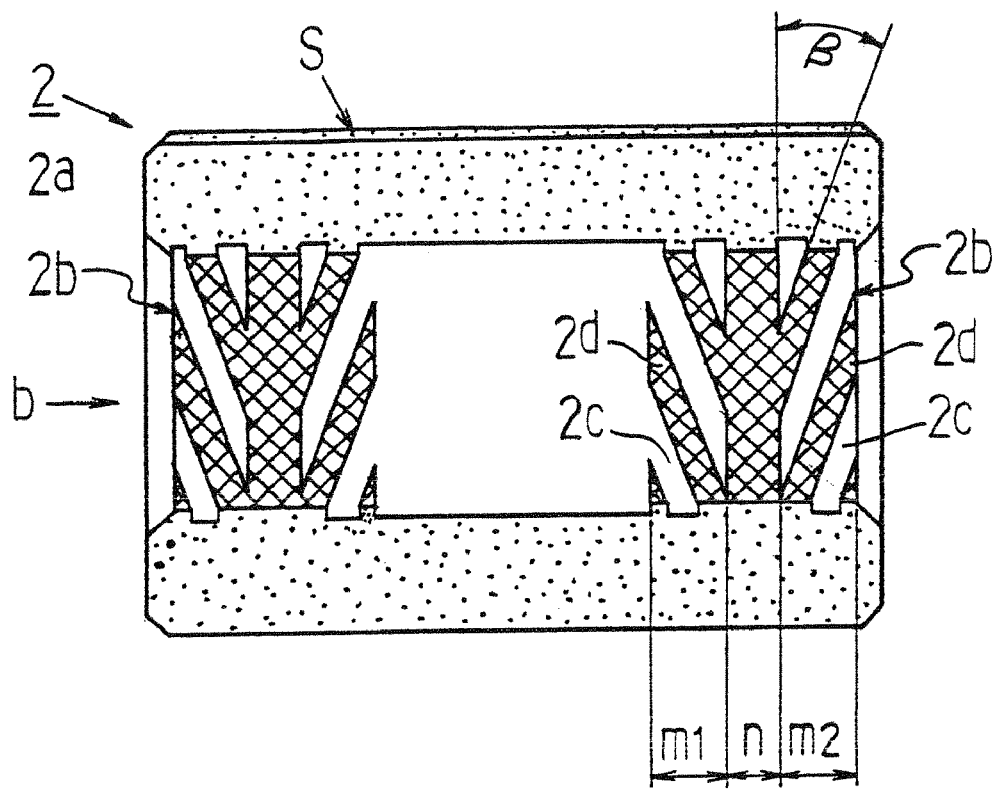
FIG. 2(a) is a longitudinal sectional view of a hydrodynamic type oil-impregnated sintered bearing.

As shown in FIGS. 2(*a*) and 2(*b*), the hydrodynamic type oil-impregnated sintered bearing 2 has a porous bearing body 2a of sintered metal, which is impregnated with lubricating oil or lubricating grease to have a self-lubricating function. The bearing body 2a is formed of sintered metal obtained in such a manner that its main material of more than one type of metal powders selected from among copper, iron, and aluminum is mixed with, according to need, powdered nickel, tin, zinc, lead, graphite, or powdered alloys thereof, and then sintered. The bearing body 2a is preferably provided so as to range from 20% to 97% in copper content, and from 6.4 to 7.2 g/cm3 in density. As the lubricating oil or the base oil of the lubricating grease to be impregnated into the bearing body 2a, a mixture of poly-α-olefin or its hydrogenated compound and ester, or ester alone is used.

In the present embodiment, two bearing surfaces 2b are formed on the inner periphery of the bearing body 2a so as to be separated each other. In both the two bearing surfaces 2b are formed a plurality of hydrodynamic pressure generating grooves 2c slanting against an axial direction. Each bearing surface 2b comprises a first region m1, a second region m2 provided so as to be separated from the first region m2, and an annular smooth region n arranged between the first region m1 and the second region m2. In the first region m1, a plurality of hydrodynamic pressure generating grooves 2c are arranged circumferentially so as to slant in one direction against the axial direction. In the second region m2, a plurality of hydrodynamic pressure generating grooves 2c are arranged circumferentially so as to slant in the other direction against the axial direction. The hydrodynamic pressure generating grooves 2c in the first regions m1 and the hydrodynamic pressure generating grooves 2c in the second regions m2 are sectioned by the smooth regions n so as to be disconnected from each other. Ridges 2d (the areas between hydrodynamic pressure generating grooves 2c) in the first regions m1 and ridges 2d in the second regions m2 are at the same level as the smooth regions n. Surface holes are distributed nearly uniformly over the whole areas of the bearing surfaces 2b including the forming areas of the hydrodynamic pressure generating grooves 2c.

When a relative rotation occurs between the bearing body 2a and the shaft 4, the oil in the bearing clearance is drawn toward the smooth regions n by the hydrodynamic pressure generating grooves 2c formed in the first regions m1 and the second regions m2 so as to slant in the opposite directions, and gathered to the smooth regions n. Therefore, the lubricating film is increased in pressure at the smooth regions n, thereby obtaining high bearing rigidity.

The slanting angle of the hydrodynamic pressure generating groove 2c may be set at a given value, and is better set so that the angle β against the orthogonal direction to the axial direction ranges from 15° to 40°, and more preferably from 15° to 25°. The width ratio between the hydrodynamic pressure generating grooves 2c and the ridges 2d is better set so as to range from 0.8 to 1.5, and preferably from 1.0 to 1.2. Besides, regarding the axial width of one bearing surface 2b as 1, the axial width ratio R of the smooth region n is better set within a range where R=0.1-0.6, and preferably R=0.2-0.4. At R below 0.1, the smooth regions n do not noticeably develop the effect of increasing the bearing rigidity resulting from their provision. On the other hand, at R above 0.6, the first regions m1 and the second regions m2 become so small in axial width that the hydrodynamic pressure effects of the hydrodynamic pressure generating grooves 2c are not exerted effectively.

The hydrodynamic pressure generating grooves 2c have a certain optimum range in the ratio between a groove depth h (see FIG. 4) and a bearing radius clearance c (the difference between the radii at the portions of a bearing surface 2b and a ridge 2d). Outside the optimum range, the hydrodynamic pressure effect cannot be adequately obtained. In order to determine the optimum range, measurements have been made on jitter using the polygon scanner motor shown in FIG. 1. The measurements have confirmed that the c/h within 0.5¬2.0 can suppress jitter to a level enough for practical use. To take an example, at groove depths h ranging from 2 to 4 μm, the bearing radius clearance c is better set to range from 2 to 4 μm.

The inner diameters of the bearing body 2a at areas between the bearing surfaces 2b are set to be greater than the inner diameters at the ridges 2d on the bearing surfaces 2b.

The respective bearing surfaces 2b are not limited to those shown in FIG. 2(*a*) in shape, and may be arranged so that, for example, the hydrodynamic pressure generating grooves slanting in one direction against an axial direction and those slanting in the other direction are paired and axially connected into V-shapes (in this case, the annular smooth region n is not provided).

Under such use conditions that the rotating bodies are well balanced and the bearing rigidity is of little consequence, the bearing surfaces having the axially-connected hydrodynamic pressure grooves are sometimes more preferable since they are hard to produce negative pressures. Inasmuch as slanting against an axial direction, hydrodynamic pressure generating grooves in the bearing surfaces may be provided in any shape. For example, the grooves may take a spiral shape.

As for lubricating oil or base oil of lubricating grease to be impregnated into the bearing body 2a, those ranging from 5 to 60 cSt in kinematic viscosity at a temperature of 40° C. may be used. Note that, however, since polygon scanner motors are required for lower torques in rotating at high speeds of several tens of thousands rpm, the oil to be used ranges preferably from 5 to 20 cSt in kinematic viscosity, close to the lower limit of the above-described range. Lubricating grease is impregnated into the bearing body 2a to provide higher apparent viscosities than those in the case of lubricating oil in all portions except inside the bearing clearance under shearing forces. Therefore, the impregnation of lubricating grease is effective for avoiding the outward run-off of oil. In the case, a thickener is preferably dispersed into the base oil at compounding ratios ranging from 0.1% to 5.0% by weight. At compounding ratios of thickener above 5.0% by weight, the apparent viscosity becomes too high, which results in complicated operations in its impregnating process. That is, the bearing does not sink into the grease instantly, and it becomes harder to remove the grease off the surfaces of the bearing after the impregnation. On the other hand, at compounding ratios of thickener below 0.1% by weight, the above-described effects resulting from the lubricating grease impregnation are not obtained.

In inserting the rotating shaft 4 into the inner periphery of the hydrodynamic type oil-impregnated sintered bearing 2 to assemble the spindle motor, the same (or the same kind of) lubricating oil as the lubricating oil or the base oil of the lubricating grease impregnated into the bearing body 2a is better applied, in addition to the impregnated oil, so as to wet the bearing surface of the thrust bearing 3 and to fill the bearing clearance of the hydrodynamic type oil-impregnated sintered bearing 2. In the hydrodynamic type oil-impregnated sintered bearing 2, the lubricating oil or the base oil of the lubricating grease impregnated inside the bearing body 2a exudes out from the surfaces of the bearing body 2a (here, the base oil of the lubricating oil exudes out with a small amount of thickener component) due to its thermal expansion resulting from increases in pressure and in temperature created with the rotation of the rotating shaft 4, and is drawn into the bearing clearance by the action of the hydrodynamic pressure generating grooves 2c. Here, since the bearing clearance of the hydrodynamic type oil-impregnated sintered bearing 2 is filled with the oil in the early stage of activation, the entrainment of air is prevented, the lubricating film is adequately formed, and the stable bearing functions are obtained. Moreover, since being wet with oil in the early stage of activation, the bearing surface of the thrust bearing 3 is in sufficient lubrication.

Figure 2B:
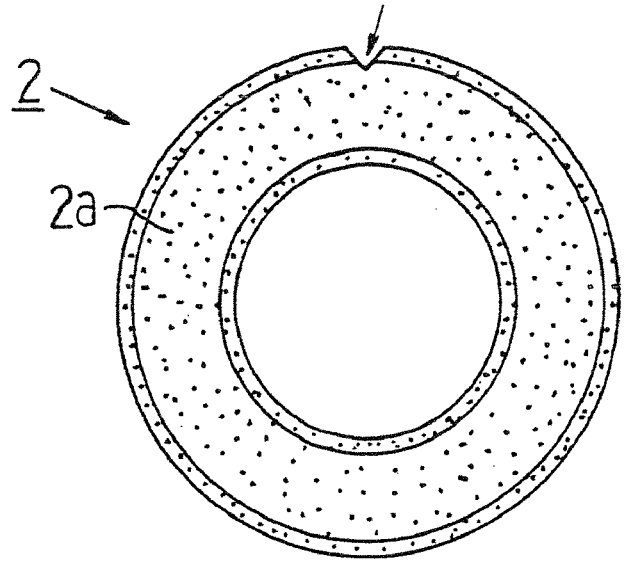
FIG. 2(b) is a front view of the same.

The rotating shaft 4 is generally inserted into the inner periphery of the hydrodynamic type oil-impregnated sintered bearing 2, with the thrust bearing 3 mounted on the lower opening portion of the housing 1. In this insertion, air is let out through the bearing clearance between the bearing 2 and the rotating shaft 4. However, since the bearing clearance is not wider than several micrometers, the air is sometimes trapped in a lower space of the housing 1 to toughen the inserting process of the rotating shaft 4. Besides, in rotating the motor, generated heat possibly expands the air entrapped in the lower space of the housing 1 to thrust up the rotating shaft 4, which destabilizes the bearing functions. In these cases, as shown in FIGS. 1 through 2(b), an air passage S opening at both axial ends of the bearing body 2a is better provided between the outer periphery of the bearing 2 and the inner periphery of the housing 1 so as to let the air in the lower space of the housing 1 through the air passage S. Note that, while in the present embodiment the air passage S is formed in the outer periphery of the bearing body 2a, the air passage S may be formed in the inner periphery of the housing 1. Besides, only one air passage S may be provided, or a plurality of the same may be circumferentially provided.

The bearing surfaces 2b have surfaces holes; therefore, when a positive pressure is produced in the bearing clearance of the hydrodynamic type oil-impregnated sintered bearing 2, the oil ref lows through the surface holes in the bearing surfaces 2b to the inside of the bearing body 2b. Here, in the cases where a large difference consist in respective dimensions of surface holes in the bearing surfaces 2b and pores in the surface layer portions at a prescribed depth from the bearing surfaces 2b, the oil in the bearing clearance is easily driven back to the inside of the bearing body 2a through larger holes and pores. This sometimes results in a non-uniform pressure distribution in the bearing clearance (or causes local pressure drops), and affects the rotational accuracy. Here, when lubricating grease is used as the lubricant to be impregnated into the bearing body 2a, the thickener of the lubricating grease is selectively embedded into the larger holes and pores in the bearing body 2a to average surface holes and pores in apparent dimension, thereby securing the proper circulation of oil between the inside of the bearing body 2a and the bearing clearance. This solves the above-described problem in the non-uniformity of pressure distribution (the local pressure drops), and allows fresh oil to be sequentially and continuously driven into the bearing clearance by the hydrodynamic pressure effect of the hydrodynamic pressure generating grooves 2c; therefore, the film formability and the radial rigidity of the lubricating film is maintained at a high level. As a result, the rotating shaft 4 is non-contact supported by the hydrodynamic type oil-impregnated sintered bearing 2 without producing unstable vibrations such as a whirl. Besides, shaft run-out, NRRO, jitter, and the like are lowered. Furthermore, since the rotating shaft 4 rotates without contacting the bearing body 2a, the hydrodynamic type oil-impregnated sintered bearing 2 is low in noise and cost.

The bearing surfaces 2b having the slanting hydrodynamic pressure generating grooves 2c as described above can be formed by compression molding. This process is performed, for example, in such a manner that: a forming mold corresponding to the shapes of the bearing surfaces 2b is formed on the outer periphery of a core rod such as a sizing pin to be used for working an oil-impregnated sintered bearing; the outer periphery of the core rod is supplied with sintered metal material of cylindrical shape as the material of the bearing body 2a; and a compressing force is applied to the sintered metal material to press the inner periphery of the material against the forming mold on the core rod, thereby transferring the shape of the forming mold to the inner periphery of the sintered metal material. Here, the forming areas of the hydrodynamic pressure generating grooves 2c in the bearing surfaces 2b and the other areas (the ridges 2d and the smooth regions n) can be molded simultaneously. In this case, the forming mold on the core rod can be finished with higher accuracies to improve the molding accuracy of the bearing surfaces 2b. It is relatively easy to finish a forming mold on a core rod within required accuracies, for example, a roundness of 1 μm and a cylindricity of 2 μm. After the molding of the bearing surfaces 2b, the core rod can be released from the inner periphery of the sintered metal material without deforming the shapes of the hydrodynamic pressure generating grooves 2c by utilizing the spring back of the sintered material, and by utilizing a difference in thermal expansions of the core rod and the sintered metal material in addition to the spring back.

In advance to the above-described molding of the bearing surfaces, the inner periphery of the sintered metal material is preferably subjected to, for example, rotational sizing to adjust the inner periphery in the rate of surface hole area in advance. The bearing surfaces 2b of the finished bearing body 2a is better smaller in the rate of surface hole area than standard oil-impregnated sintered bearings having no hydrodynamic pressure generating groove (generally on the order of 20% to 30%). For example, the rate of surface hole area of the bearing surfaces 2b can be set within 3-15% to ensure the proper circulation of oil as well as to maintain the sufficient formation of lubricating film; this is advantageous for suppressing the deformation and degradation of the oil to the minimum. The rate of surface hole area is better adjusted in relation to the viscosity of the lubricating oil, which varies according to driving conditions. For example, when low-viscositied oil is used, the rate is preferably adjusted to be around 5% since such oil is easy to move; and when high viscositied oil is used, it is preferably about 10% for high-viscositied oil since such oil is hard to move. Note that, however, the rates of surface hole area below 3% hampers the proper circulation of the oil, and tends to accelerate the deformation and degradation of the oil even when low-viscositied oil is used. On the other hand, at the rates of surface hole area exceeding 15%, the amount of oil returning from the bearing clearance to the inside of the bearing body becomes too large, unpreferably lowering the pressure of lubricating film. In this connection, the rate of surface hole area can also be adjusted through, other than the rotational sizing as described above, the setting of the density of bearing body 2a, or through a combined process of the surface finishing and the density setting.

EXAMPLES 1 TO 3

Comparative tests were made on occurrence of whirls using the polygon scanner motor as shown in FIG. 1. The hydrodynamic type oil-impregnated sintered bearings 2 were impregnated with respective lubricating oils mentioned below. The rotating shafts 4 were replaced with longer ones to project from the top of the bearing so that the behavior of the shaft could be measured with a non-contact type displacement gauge.

Example 1: PAOH (1) 95 wt %+ester 5 wt %
kinematic viscosity 23.9 cSt (40° C.)
Example 2: PAOH (2) 90 wt %+ester IO wt %
kinematic viscosity 23.6 cSt (40° C.)
Example 3: ester 100 wt %
kinematic viscosity 19 cSt (40° C.)
Comparative example 1: PAOH (1) 100 wt %
kinematic viscosity 24 cSt (40° C.)
Comparative example 2: PAOH (2) 100 wt %
kinematic viscosity 17 cSt (40° C.)
(* The above-mentioned percentages by weight show the compounding ratios between the PAOHs and ester)
PAOH (1): poly-α-olefin hydrogenated compound
 (SHINLUBE 501, a product of Shin Nittetsu Chemical Co., Ltd.
 carbon number 30: 96 wt %,
 carbon number 40: 4 wt %)
PAOH (2): poly-α-olefin hydrogenated compound
 (SHINLUBE 401, a product of Shin Nittetsu Chemical Co., Ltd.
 carbon number 20: 0.2 wt %,
 carbon number 30: 80-90 wt %,
 carbon number 40: 19.8-9.8 wt %)
Ester: polyol ester
 (H2937, a product of HATCO Chemical Corp.)

The tests were run on five motors each under a condition of a revolution number of 20000 rpm, amounts of unbalance of the rotating bodies below 10 mg·cm, normal temperatures and normal humidities. The results are collectively shown in Table 1, which illustrates the number of whirl-suffering motors among the fives.

While whirls occurred so often in the comparative examples 1 and 2 with PAOHs of 100% by weight, whirls were greatly suppressed in the Examples 1 and 2 in which ester was compounded at prescribed percentages by weight and in the Example 3 in which ester of 100% by weight was used (no PAOH included). These test results show that the compounding of ester to PAOH can offer the sufficient effect of avoiding whirls at compounding ratios above 5% by weight. They also show that ester also provides the same effect of avoiding whirls when used as the main component (100% by weight) without PAOH. However, it should be noted in using ester that possibly existing resins, especially polycarbonate and the like, are easily expanded to generate cracks. The compounding ratio of ester is better set to be below 40% by weight in the cases where resins, especially polycarbonate and the like, exist nearby.

EXAMPLES 4 TO 9

Endurance tests were made using the polygon scanner motors as shown in FIG. 1 to evaluate changes in shaft run-out and electric current value. Respective oil-impregnated sintered bearings were impregnated with lubricating oil or lubricating grease compounded with certain components shown in abbreviated codes in Table 2. The respective components represented in the abbreviated codes in Table 2 are as follows, in which their compounding ratios are shown in percentage by weight. Examples 7 and 8 use lubricating greases, and the other Examples use lubricating oils. In this connection, the word "Bal" in Table 2 means a balance obtained by subtracting the sum of compounding ratios of the numeral-shown components from a total of 100. "SG" in the bearing-type row represents a hydrodynamic type oil-impregnated sintered bearing having slanting hydrodynamic pressure generating grooves in its bearing surfaces (the configuration as shown in FIG. 2), and "NSG" represents an oil-impregnated sintered bearing (cylindrical bearing) having no slanting hydrodynamic pressure generating groove in its bearing surfaces. The "SG"s and "NSG"s are the same in all specifications but the presence of hydrodynamic pressure generating grooves.

PAOH (1): poly-α-olefin hydrogenated compound
 (Shinfluid 501, a product of Shin Nittetsu Chemical Co., Ltd.
 carbon number 30: 96 wt %,
 carbon number 40: 4 wt %)
PAOH (2): poly-α-olefin hydrogenated compound
 (Shinfluid 401, a product of Shin Nittetsu Chemical Co., Ltd.
 carbon number 20: 0.2 wt %,
 carbon number 30:80-90 wt %,
 carbon number 40: 19.8-9.8 wt %)
POE: polyol ester
 (H2937, a product of HATCO Chemical Corp.)
PMMA: polymethacrylate
 (100° C. kinematic viscosity: 1550 cSt)
TP: trioctyl phosphate
L57: dioctyldiphenylamine
BTA: metal deactivator (benzotriazole derivative)
CE: aminosuccinic acid ester (rust preventive) URE: diurea thickener
LT: lithium stearate soap The tests were run under a condition of a revolution number of 20000 rpm, amounts of unbalance of the rotating bodies below 10 mg·cm, a bearing clearance of 8 μm, and an atmospheric temperature of 50° C. Table 3 shows the test results. Each value in Table 3 shows the motor's life time, which is obtained as a time point where the measurement on electric current overruns ±20% the initial value thereof or the measurement on shaft run-out exceeds +40% the initial value thereof. Note that the goal of the tests was set at 3000 hours. In the cases where a motor had been driven up to 3000 hours without any failure, the test was ended at the point. In such a case, the test result is expressed as "3000↑". Besides, the measurements were made at every 200 hours, and time points in which the dissatisfaction of the above-mentioned criteria was detected are listed as the life times h. Polygon scanner motors are generally required for endurance lives above 2000 hours; therefore, those having life times h above 2000 hours are considered as practically usable.

The test results in Table 3 show that all of the Examples 4 through 9 are above 2000 hours in life time h, and thus practically usable. Preferable results are obtained especially in the cases of the higher ester compounding ratios (the Examples 4, 5, 7, and 8) and in the cases of the lubricating grease impregnation (the Examples 7 and 8). On the other hand, despite its hydrodynamic type oil-impregnated sintered bearing, the comparative example 4 with no ester compounded was relatively short in life, and expired in life before reaching to 2000 hours. Since arranged to be below 5% in ester compounding ratio, the Example 9 has a shorter life as compared with the other Examples. While its PAOH was compounded with ester of 10% by weight, the comparative example 5 using a cylindrical bearing produced odd noises at the first measurement of 200 hours, and expired in life.

Figure 5:
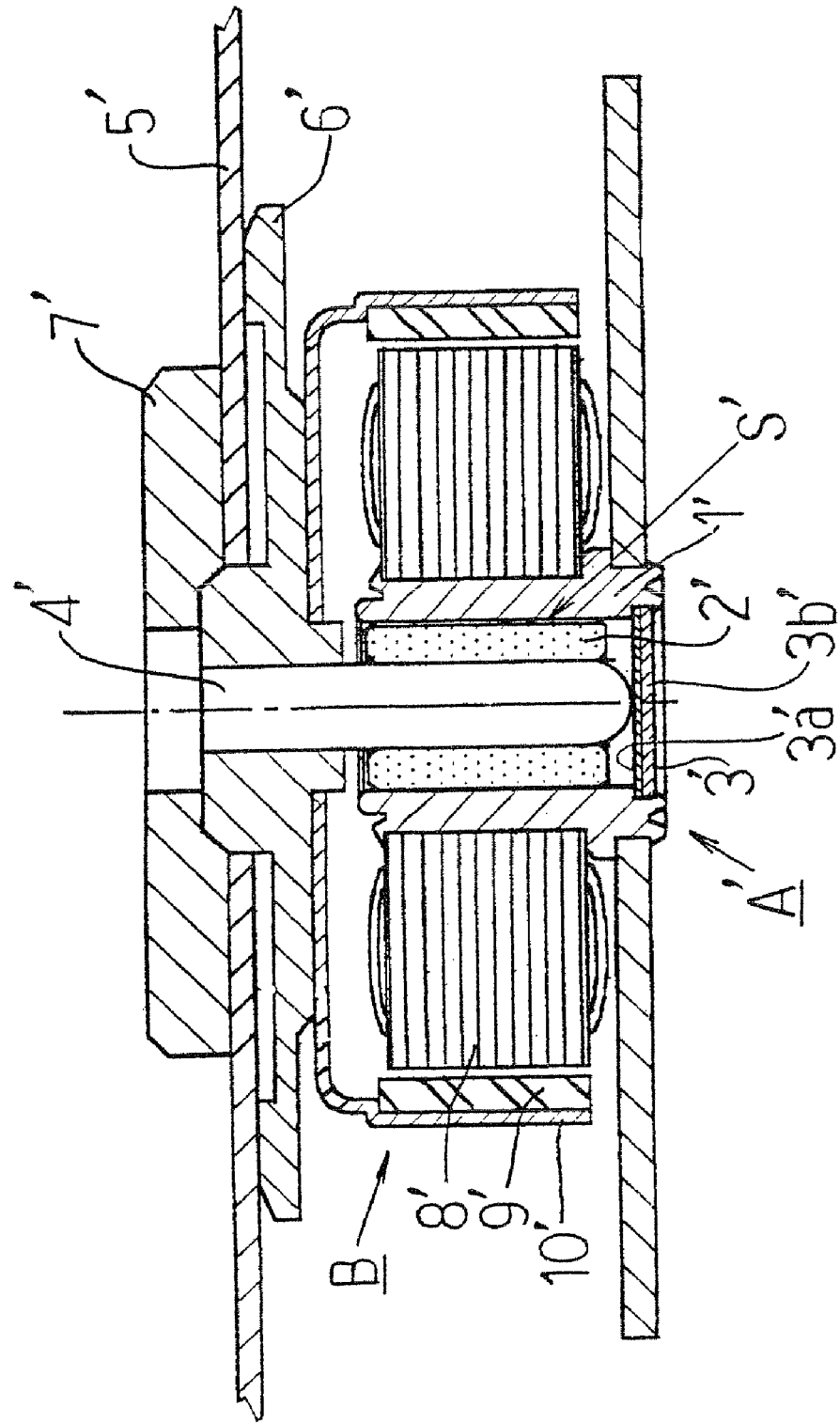
FIG. 5 is a cross-sectional view of a spindle motor according to an embodiment in a DVD-ROM/RAM device.

FIG. 5 shows an example of a spindle motor for a DVD-ROM/RAM device as a sort of information equipment. This spindle motor is composed chiefly of: a bearing unit A' for rotatably supporting a vertically-arranged rotating shaft 4'; a turntable 6' and clamper 7' for supporting and fixing an optical disk 5' such as a DVD¬ROM mounted on the top of the rotating shaft 4'; and a motor unit B' having, for example, a stator 8' and rotor magnet 9' arranged so as to face each other via an radial gap. The stator 8' is fixed to the outer periphery of a housing 1' constituting the bearing unit A'. The rotor magnet 9' is fixed to the inner periphery of a rotor case 10' mounted on the turntable 6'. Energizing the stator 8' rotates the rotor case 10', turntable 6', optical disk 5', clamper 7', and rotating shaft 4' being integral with the rotor magnet 9'.

The bearing unit A' is composed of the tubular housing 1, a hydrodynamic type oil-impregnated sintered bearing 2' fixed to the inner periphery of the housing 1', and a thrust bearing 3' fixed to the lower opening portion of the housing 1'. The hydrodynamic type oil-impregnated sintered bearing 2' supports the outer periphery of the rotating shaft 4' in a radial direction, and the thrust bearing 3' supports the rotating shaft 4' in a thrust direction. In the present Examples, the thrust bearing is composed of a resin thrust washer $3a'$ of disk form and a back metal $3b'$ for supporting the same, and is configured so that the upper surface of the resin thrust washer $3a'$ contact supports the convex lower end surface of the rotating shaft 4' in the thrust direction. In this connection, the resin thrust washer $3a'$ may be embedded in the central portion of the back metal $3b'$ so as to contact with the lower end surface of the rotating shaft 4.

The bearing body of the hydrodynamic type oil-impregnated sintered bearing 2' is in conformity with the bearing body $2a$ shown in FIG. 2 in material, configuration, fabricating process, and the like. In the present invention, the porous bearing body of sintered material is impregnated with lubricating grease as a lubricant so as to have a self-lubricating function.

As the base oil of the lubricating grease to be impregnated into the bearing body, those set to range from 5 to 60 cSt in kinematic viscosity at 40° C. may be used. Those ranging from 10 to 50 cSt are preferable especially in such equipment as a DVD-ROM/RAM required for radial rigidity against unbalanced load resulting from the loading of disks. As the base oil in the present Example a lubricating oil of 40 cSt in kinematic viscosity at 40° C. was used, whose main component of polyol ester oil is compounded with polymethacrylate as a viscosity index improver, phenyl-a-naphthylamine as an antioxidant, benzotriazole derivative as a metal deactivator, and trioctyl phosphate as an anti-abrasion agent.

As the thickener of the above-described lubricating grease lithium soap and urea compounds were used.

The lithium soap of the thickener reacts stearic acid with $LiOH.H_2O$ into grease. For a start, a third of the base oil and stearic acid are put into a reaction container, and heated up to 80° C. When the solvent becomes clear, water and $LiOH.H_2O$ are well mixed and put into the reaction container. Then, dewatering is performed for one hour. After the dewatering, the remaining base oil is put thereinto slowly so as not to lower the temperature. On reaching to 185° C., the reaction is ended.

As for the monourea of the thickener, octadecylamine was used as the material amine, and octadecylisocyanate was used as the monocyanate. As for the diurea, p-toluidine was used as the material amine whose terminal group became an aromatic group, n-octylamine as the material amine whose terminal group became an alicyclic group, and cyclohexylamine as the material amine whose terminal group became an aliphatic group. Besides, as the diisocyanate, diphenylmethane-4,4'-diisocyanate was used. As for the triurea, octadecylamine was used as the material amine, and trilenediisocyanate and water were used as isocyanate. To give a concrete explanation by taking diurea as an example, a half amount of the base oil and the whole amount of the monoamine shown in Table 4 were put into a reaction container, and heated up to 70-80° C. The remaining half amount of the base oil and diphenylmethane-4,4'-diisocyanate were put into another container and heated up to 70-80° C. before put into the above-mentioned reaction container and stirred. The stirring was kept for about 30 minutes for sufficient reaction. Then, the resultant was heated up to 170-180° C., kept for 30 minutes, and then cooled into a base grease.

Like the above-described Examples, in inserting the rotating shaft 4' into the inner periphery of the hydrodynamic type oil-impregnated sintered bearing 2' to assemble the spindle motor, the same (or the same kind of) lubricating grease or base oil of the lubricating grease as that of the lubricating grease impregnated into the bearing body is better applied, in addition to the impregnated grease, so as to wet the bearing surface of the thrust bearing 3' and to fill the bearing clearance of the hydrodynamic type oil-impregnated sintered bearing 2'. Besides, an air passage S' opening at both axial ends of the bearing body may be provided between the outer periphery of the bearing 2' and the inner periphery of the housing 1' so as to let the air entrapped in the lower space of the housing 1' through the air passage S'.

EXAMPLES 10 TO 16

Comparative tests were made on shaft run-off of the rotating shafts 4' using the spindle motors for DVD-ROM/RAM as shown in FIG. 5. The hydrodynamic type grease/oil-impregnated sintered bearings used in the tests were impregnated with lubricants shown in Table 4. The Examples 10 to 16 were impregnated with the lubricating greases, and the comparative example 6 was impregnated with the lubricating oil. Besides, the rotating shafts 4' were replaced with longer ones so as to project from the top of the bearing, and the behavior of the shaft were measured with a non-contact type displacement gauge.

The tests were run under a condition of revolution numbers ranging from 1000 to 8000 rpm, an unbalanced load of the rotating bodies of 1 g·cm, normal temperatures, and normal humidities. The bearings and the bearing surfaces were specified as follows:

[Specification for Bearing]

Diameter of shaft: $\phi$ 3 mm

Dimensions of bearing: $\phi$ 3 in inner diameter×$\phi$ 6 in outer diameter×8.7 mm in width Number of bearing surfaces: two at upper and lower portions Axial width of bearing surface: 2.4 mm

[Specification for Hydrodynamic Pressure Generating Groove] (The Same Configuration as Shown in FIG. 2)

Depth of groove: 3 μm

Angle of groove: 20°

Number of grooves: eight

Figure 6:
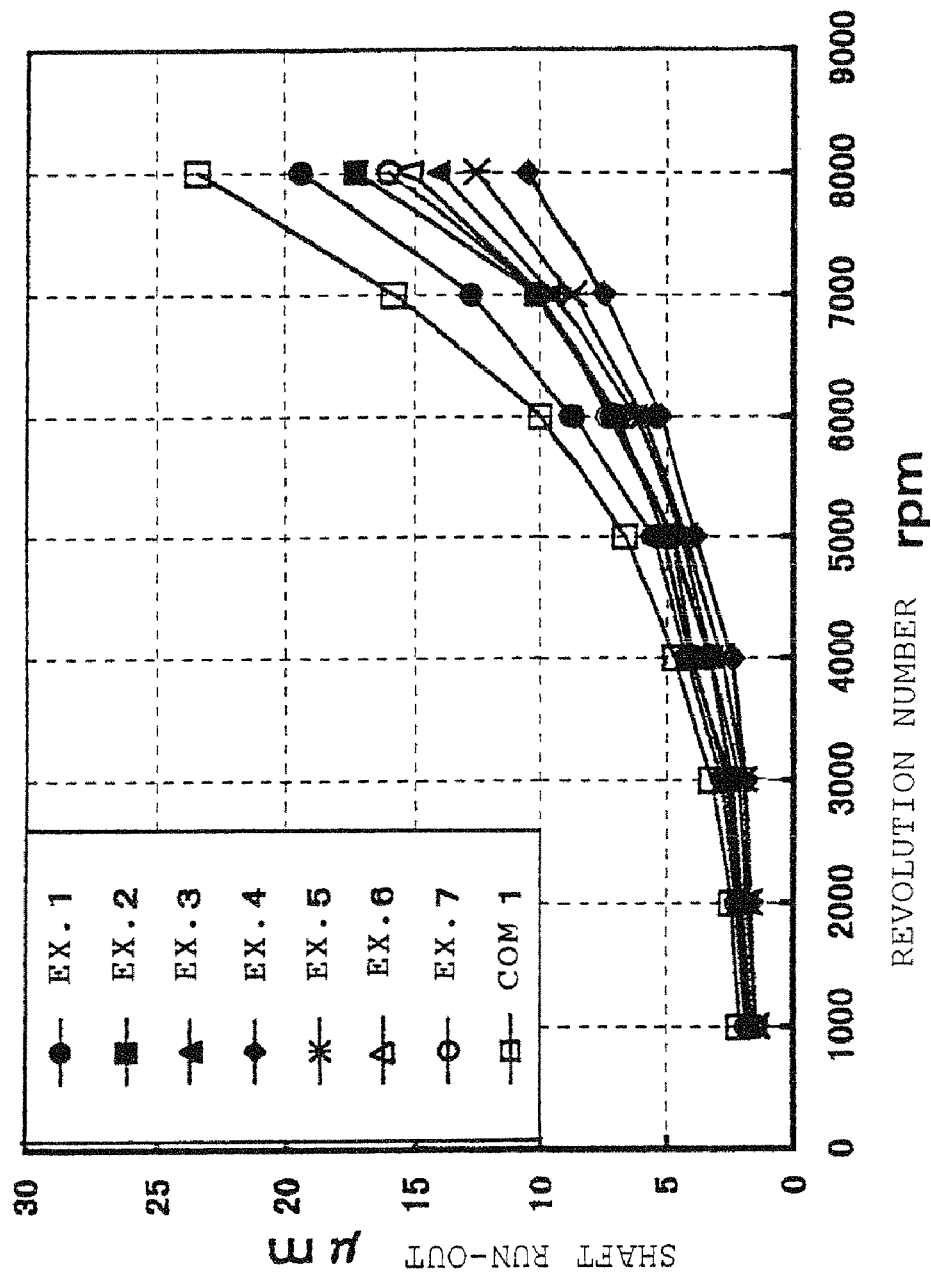
FIG. 6 is a diagram showing the comparative test results on shaft run-out.

FIG. 6 collectively shows the test results. As shown in FIG. 6, shaft run-out was lowered in any of the embodiments 10 to 16 impregnated with the lubricating greases as compared with the comparative example 6, and especially noticeably in the embodiment 13 in which urea was used as the thickener.

The test results confirm that, in hydrodynamic type bearings of this type, those impregnated with lubricating greases are further improved in bearing rigidity than those impregnated with lubricating oils, and thereby effective for the suppression of shaft run-out.

While there has been described what are at present considered to be preferred embodiments of the invention, it will be understood that various modifications may be made thereto, and it is intended that the appended claims cover all such modifications as fall within the true spirit and scope of the invention.

TABLE 1

|  | NUMBER OF WHIRL-SUFFERING MOTORS |
|---|---|
| EXAMPLE 1 | 1/5 |
| EXAMPLE 2 | 0/5 |
| EXAMPLE 3 | 0/5 |
| COMPARATIVE EXAMPLE 1 | 5/5 |
| COMPARATIVE EXAMPLE 2 | 4/5 |

TABLE 2

| ITEM | EX. 4 | EX. 5 | EX. 6 | EX. 7 | EX. 8 | EX. 9 | COMPARATIVE EX. 4 | COMPARATIVE Ex. 5 |
|---|---|---|---|---|---|---|---|---|
| PAOH1 | — | 15.8 | 15.1 | 15.8 | 15.8 | 15.0 | 16.1 | 15.8 |
| PAOH2 | — | Bal | Bal | Bal | Bal | Bal | Bal | Bal |
| POE | Bal | 10 | 5 | 10 | 10 | 4 |  | 10 |
| PMMA | 1.0 | 1.0 | 1.0 | 1.0 | 1.0 | 1.0 | 1.0 | 1.0 |
| TP | 1.0 | 1.0 | 1.0 | 1.0 | 1.0 | 1.0 | 1.0 | 1.0 |
| BTA | 0.05 | 0.05 | 0.05 | 0.05 | 0.05 | 0.05 | 0.05 | 0.05 |
| CE | 0.1 | 0.1 | 0.1 | 0.1 | 0.1 | 0.1 | 0.1 | 0.1 |
| URE | — | — | — | — | 2.5 | — |  |  |
| LT | — | — | — | 1.0 | — | — |  |  |
| BEARING TYPE | SG | SG | SG | SG | SG | SG | SG | NSG |

TABLE 3

| ITEM | EX. 4 | EX. 5 | EX. 6 | EX. 7 | EX. 8 | EX. 9 | COMPARATIVE EX. 4 | COMPARATIVE Ex. 5 |
|---|---|---|---|---|---|---|---|---|
| PAOH1 | 3000↑ | 2600 | 2200 | 2800 | 3000↑ | 2050 | 1200 | 200 |

TABLE 4

| ITEM | EX. 10 | EX. 11 | EX. 12 | EX. 13 | EX. 14 | EX. 15 | EX. 16 | COMPARATIVE EX. 6 |
|---|---|---|---|---|---|---|---|---|
| BASE OIL | POE | POE | POE | POE | POE | POE | POE | POE |
| TYPE OF THICKENER | Li | MU | DU | DU | DU | DU | TU | — |
| TERMIAL GROUP OF UREA (AROMATIC:ALPHATIC) | (—) | (0:10) | (8:2) | (5:5) | (2:8) | LINEAR CARBON CHAIN | (10:0) | (—) |

POE: H2937 (A PRODUCT OF HATCO CORP.)
Li: LITHIUM STEARATE SOAP
MU: MONOUREA
DU: DIUREA
TU: TRIUREA
POE ADDITIVE: POLYMETHACRYLATE (AQLUBE 707, A PRODUCT OF SANYO CHEMICAL INDUSTRIES, LTD: 5 wt %)
PHENYL-α-NAPHTYLAMINE: 1% BY WEIGHT
BENZOTRIAZOLE DERIVATIVE: 0.05% BY WEIGHT

The invention claimed is:

1. A hydrodynamic type grease-impregnated sintered bearing comprising:
a porous bearing body of sintered metal having a bearing surface opposed to a sliding surface of a rotating shaft to be supported via a bearing clearance, and hydrodynamic pressure generating grooves slating against an axial direction provided in the bearing surface; and
a lubricant impregnated in pores inside said bearing body,
wherein the lubricant impregnated into said bearing body is a lubricating grease comprising a thickener in a compounding ratio of from 0.1% to 5.0% by weight,
wherein the rate of area of surface holes of the bearing surface is set within a range of 3%-15%, wherein a base oil of said lubricating grease forms a lubricating film in the bearing clearance due to the hydrodynamic pressure generating grooves while circulating between the inside of the bearing body and the bearing clearance through the surface holes of the bearing surface, so that the lubricating film continuously non-contact supports the rotating shaft,
wherein the thickener of said lubricating grease is more than one type of urea compound selected from the group represented by the following formula (1):

R1-NHCONH—R2-NHCONII—R3, 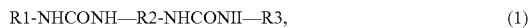 (1)

wherein R2 represents an aromatic hydrocarbon group having from 6 to 15 carbon atoms, R1 and R3 represent an aromatic hydrocarbon group having from 6 to 12 carbon atoms or an alkyl group having from 8 to 20 carbon atoms, and the rates of the aromatic hydrocarbon group in R1 and 123 range from 0% to 100% by mole.

2. The hydrodynamic type grease-impregnated sintered bearing according to claim 1, wherein said sintered metal is composed chiefly of more than one type of material selected from among copper, iron, and aluminum.

3. The hydrodynamic type grease-impregnated sintered bearing according to claim 1, wherein a plurality of bearing surfaces are formed on the inner periphery of said bearing body.

4. A spindle motor for information equipment comprising:
a rotating shaft rotating with rotating components of the information equipment;
a bearing for supporting the rotating shaft; and
a rotor and stator arranged to face each other via a prescribed gap,
wherein said bearing comprises a porous bearing body of sintered metal having a bearing surface opposed to a sliding surface of the rotating shaft via a bearing clearance, and hydrodynamic pressure generating grooves slating against an axial direction provided in the bearing surface, and a lubricant impregnated in pores inside said bearing body,
wherein said lubricant is a lubricating grease comprising a thickener in a compounding ratio of from 0.1% to 5.0% by weight,
wherein the rate of area of surface holes of the bearing surface is set within a range of 3%-15%,
wherein a base oil of said lubricating grease forms a lubricating film in the bearing clearance due to the hydrodynamic pressure generating grooves while circulating between the inside of the bearing body and the bearing clearance through the surface holes of the bearing surface, so that the lubricating Elm continuously non-contact supports the rotating shaft, and
wherein the thickener of said lubricating grease is more than one type of urea compound selected from the group represented by the following formula (1):

R1-NHCONH—R2-NHCONII—R3, 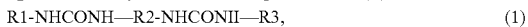 (1)

wherein R2 represents an aromatic hydrocarbon group having from 6 to 15 carbon atoms, R1 and R3 represent an aromatic hydrocarbon group having from 6 to 12 carbon atoms or an alkyl group having from 8 to 20 carbon atoms, and the rates of the aromatic hydrocarbon group in RI and 123 range from 0% to 100% by mole.

5. The spindle motor for information equipment according to claim 4, wherein said sintered metal is composed chiefly of more than one type of material selected from among copper, iron, and aluminum.

6. The spindle motor for information equipment according to claim 4, wherein a plurality of bearing surfaces are formed on the inner periphery of said bearing body.

* * * * *